(12) United States Patent
Andersen et al.

(10) Patent No.: US 7,522,306 B2
(45) Date of Patent: Apr. 21, 2009

(54) METHOD AND APPARATUS FOR GENERATING A CALIBRATION TARGET ON A MEDIUM

(75) Inventors: Eric L. Andersen, Meridian, ID (US); Wesley Alan Fujii, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

(21) Appl. No.: 10/777,559

(22) Filed: Feb. 11, 2004

(65) Prior Publication Data

US 2005/0219590 A1  Oct. 6, 2005

(51) Int. Cl.
G06F 15/00 (2006.01)
G06K 1/00 (2006.01)
H04N 1/60 (2006.01)
H04N 1/46 (2006.01)

(52) U.S. Cl. .......................... 358/1.9; 358/504
(58) Field of Classification Search .................. 358/1.9, 358/1.12, 1.18, 406, 504, 507
See application file for complete search history.

(56) References Cited

U.S. PATENT DOCUMENTS

| | | | |
|---|---|---|---|
| 4,511,242 A | 4/1985 | Ashbee et al. | |
| 4,829,326 A | 5/1989 | Emmett et al. | |
| 5,185,673 A | 2/1993 | Sobol | |
| 5,194,966 A | 3/1993 | Quardt et al. | |
| 5,280,368 A | 1/1994 | Fullerton | |
| 5,530,460 A | 6/1996 | Wehl | |
| 5,642,202 A | 6/1997 | Williams et al. | |
| 5,813,771 A | 9/1998 | Ur et al. | |
| 5,864,774 A | 1/1999 | Jones | |
| 5,956,469 A | 9/1999 | Liu et al. | |
| 6,005,683 A | 12/1999 | Son et al. | |
| 6,137,893 A | 10/2000 | Michael | |
| 6,164,847 A | 12/2000 | Allen | |
| 6,226,419 B1 * | 5/2001 | Lodwick et al. | 382/294 |
| 6,310,637 B1 * | 10/2001 | Shimada et al. | 347/19 |
| 6,327,047 B1 | 12/2001 | Motamed | |
| 7,006,246 B1 * | 2/2006 | Nakajima | 358/1.9 |
| 2002/0054384 A1 | 5/2002 | Motamed | |
| 2002/0140990 A1 | 10/2002 | Liu | |
| 2002/0149798 A1 | 10/2002 | Liu | |
| 2002/0165685 A1 * | 11/2002 | Andersen et al. | 702/94 |

FOREIGN PATENT DOCUMENTS

EP  0589718  3/1994

(Continued)

OTHER PUBLICATIONS

European Search Report for EP Patent App. No. 05 25 0405, dated Jul. 28, 2006, 2 pages.

(Continued)

*Primary Examiner*—Douglas Q Tran

(57) ABSTRACT

A method is disclosed for generating a calibration target on a medium. The method can include the operation of inserting the medium into a printer with a first orientation. A further operation can be printing a first calibration feature at a first lateral location on the medium. Another operation can be reinserting the medium into the printer with a second orientation rotated 180 degrees from the first orientation. A second calibration feature can be printed at a second lateral location on the medium.

12 Claims, 15 Drawing Sheets

| | FOREIGN PATENT DOCUMENTS | |
|---|---|---|
| EP | 0895869 | 2/1999 |
| EP | 1211084 | 6/2002 |
| JP | 0428408 | 5/1991 |
| JP | 0999697 | 5/2000 |
| JP | 2003-174532 | 6/2003 |
| JP | 2003-250015 A | 9/2003 |
| JP | 2003-260788 | 9/2003 |

OTHER PUBLICATIONS

European Search Report for EP Patent App. No. 05 25 0405, dated Jul. 28, 2006 (3 Pages).

Translation of Japan Office Action for JP Patent Application No. 2005-030180, dated Sep. 1, 2006. (3 pgs).

* cited by examiner

METHOD AND APPARATUS FOR GENERATING A CALIBRATION TARGET ON A MEDIUM

BACKGROUND

Scanners have proven useful in allowing the electronic capture of images. Various types of scanners are known, including flatbed, drum, and handheld scanners. Some scanners include automatic document feeders to enable rapid and efficient scanning of multiple documents. Some characteristics$_{[AH1]}$ of a scanner, however, are most useful when appropriately calibrated. For example, scanning is most efficient when a region scanned corresponds closely to an actual extent of the object being scanned. Hence, it may be desirable to calibrate the characteristic corresponding to the lateral and longitudinal positioning of the scanning region relative the object being scanned.

For example, in a scanner with an automatic document feeder, the lateral position or alignment of the document being scanned relative to the scan head depends on mechanical tolerances in the document feeder and the position of the scan head. The alignment may need to be calibrated at initial manufacturing. Furthermore, the alignment can change with time due to wear and drift of components or due to servicing of the scanner. Calibration of this alignment characteristic may therefore be desirable.

Similarly, longitudinal positioning can depend on the relative timing of the document edges (leading and/or trailing) passing the scanning head. For example, in an automatic document feeder, there may be a media sensor separate from the scan head for triggering the start or end of scanning. Often, the media sensor is a mechanical or photoelectric detector. Timing between the media sensor and scan head may be dependent on the mechanical tolerances in the document feeder and the characteristics of the medium. For example, the rate at which media is fed through the document feeder will vary depending on mechanical wear and tolerances in the document feeder as well as the thickness, surface roughness, and other characteristics of the media. Calibration of these timing characteristics may also be desirable.

Hence, it is often desirable to perform calibration on a scanner to correct for positioning and timing errors.

DETAILED DESCRIPTION

Figure 1:
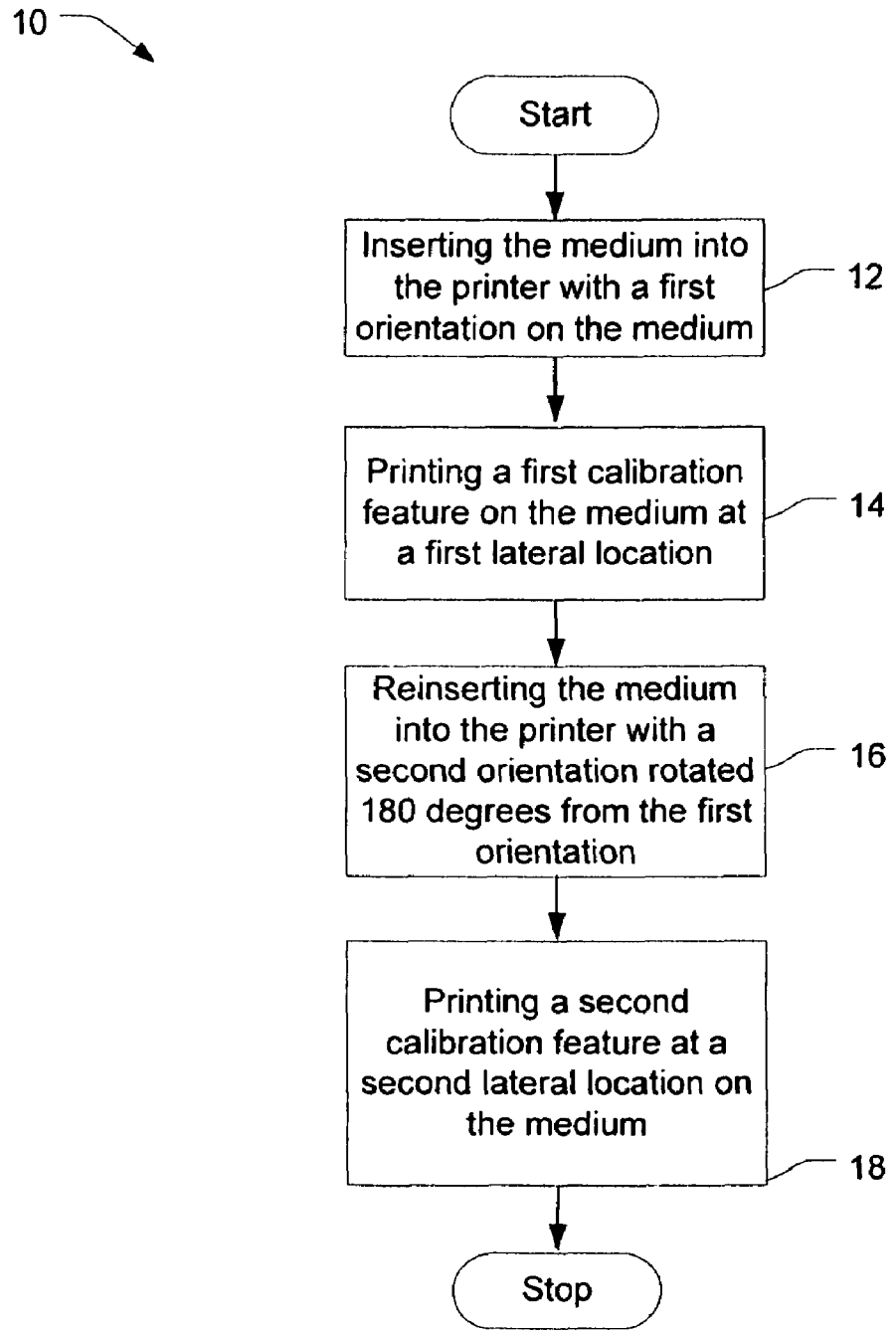
FIG. 1 is flow chart of a method of printing a calibration target in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A first embodiment of the present invention provides a method 10 of printing a calibration target on a medium. Such a calibration target may be suitable for use in calibrating a scanner as shown in FIG. 1. The method includes inserting 12 the medium into the printer with a first orientation. The method further includes printing 14 a first calibration feature on the medium at a first lateral location, a location that is offset from the center of the medium. The method further includes reinserting 16 the medium into the printer with a second orientation rotated 180 degrees from the first orientation. The method further includes printing 18 a second calibration feature on the medium at a second lateral location. By reinserting the medium into the printer reoriented 180 degrees, offset introduced by the printer may appear in a substantially symmetrically opposite manner on the first and second calibration features.

Some embodiments of the method may help reduce the effect of lateral offset introduced by a printer. For example, in a laser printer, paper path alignment from the input tray can vary by several millimeters (mm) and change over life as parts wear. Typical specifications for laser printer accuracy in placement of an image on a page are plus or minus 5 mm. However, it has been observed that page to page variations are much smaller, about 1 mm, corresponding to 24 pixels at 600 pixel per inch (PPI) resolution.

Some embodiments of the method may also help reduce the effect of errors in a laser printer optical system. For example, laser printers are typically most accurate near the centerline of the printed page due to lens shape and mirror alignment. Hence, by placing the calibration features near the centerline, a more accurate calibration target may be obtained.

Figure 2:
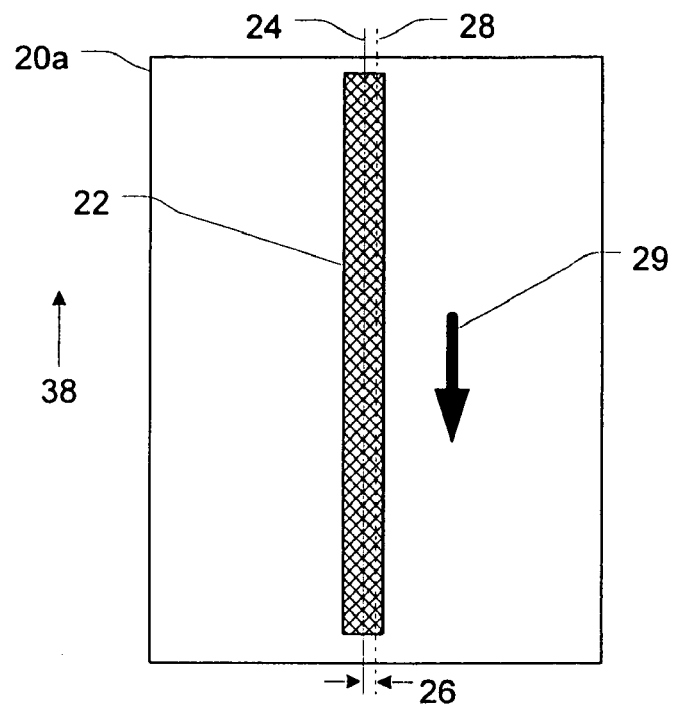
FIG. 2 is an illustration of a calibration target after printing a first calibration feature in accordance with an embodiment of the present invention.
Figure 3:
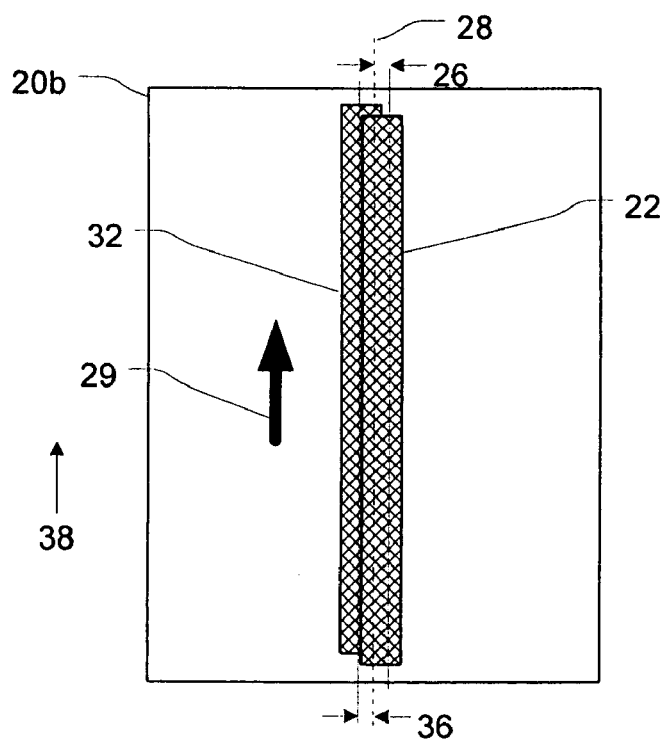
FIG. 3 is an illustration of a calibration target after printing a second calibration feature in accordance with an embodiment of the present invention.

FIGS. 2 and 3 illustrate an example application of the method 10 of printing a calibration target. FIG. 2 illustrates the medium 20*a* after printing 14 a first calibration feature 22 on the medium. The lateral location 24 of the first calibration feature on the medium will be offset 26 relative to the centerline 28 of the medium. For example, if the first calibration feature is to be printed laterally centered on the medium, offset introduced by the printer will cause the first calibration feature to be slightly offset from center as illustrated in FIG. 2. Of course, it is not necessary for the calibration features to be printed exactly at the center of the medium. If both the first and second calibration features are printed at the same nominal lateral position, they will appear at substantially symmetric positions about the centerline of the medium. The positions of the first and second calibration features may not be exactly symmetric due to page to page variations of the printer and other factors that will be apparent to one of ordinary skill in the art. Furthermore, it is not necessary for both the first and second calibration features to be printed at the same nominal position by the printer. If the first and second calibration features are printed at known, but different relative positions, this known difference can be taken into account in the calibration process, as discussed further below. Again, page to page variations of the printer and other factors may result in small errors in the position of the first and second calibration features.

Optionally, an indicator 29, for example an arrow, may also be printed to aid in reinserting 16 the medium 20*a* in the 180 degree rotated orientation. For example, the indicator may be printed to point in a direction opposite to the orientation 38 the medium was originally inserted into printer. Such an indicator would then show the 180 degree rotated orientation for reinsertion. Alternately, an indicator may also be printed to show the correct orientation of the target to be inserted into a scanner to be calibrated.

FIG. 3 illustrates the medium 20*b* after printing 16 a second calibration feature 32, where the medium has been rotated 180 degrees from the orientation of FIG. 2. The second calibration feature will also be offset 36 relative to the centerline of the medium, but in the opposite direction from the first calibration feature due to the 180-degree rotation of the medium. The offsets 26, 36 will be substantially identical. The offsets may not be exactly equal due to page to page variations of the printer and other factors that will be apparent to one of ordinary skill in the art.

Figure 7:
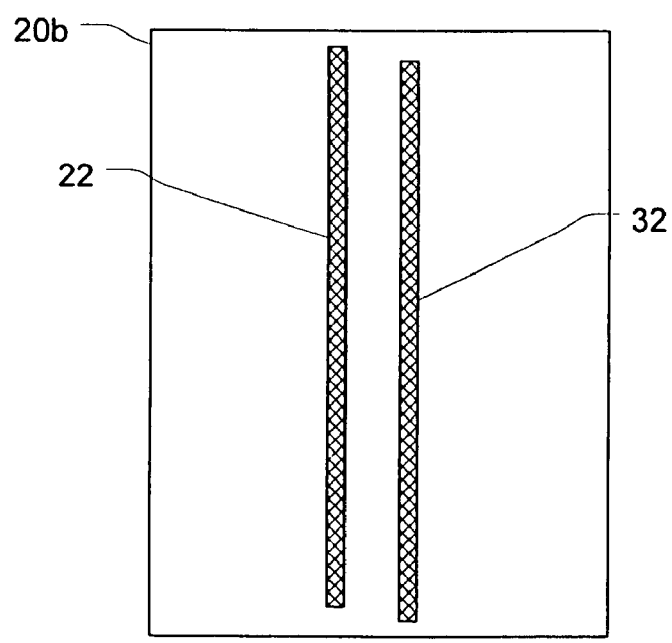
FIG. 7 is an illustration of a calibration target after printing a second calibration feature in accordance with another embodiment of the present invention.

Although the first and second calibration features 26,36 are illustrated in FIGS. 2 and 3 as wide, longitudinally oriented stripes, the calibration features are not limited to stripes. The calibration features can be longitudinally oriented lines, groups of several lines, diagonal lines, shapes, patterns, dots, or other printed features as will occur to one of ordinary skill of the art. Additionally, although the first and second calibration features are shown in FIGS. 2 and 3 as overlapping, the first and second calibration features may be printed at a nominal lateral position so there is no overlap, for example as illustrated in FIG. 7.

Printing of black calibration features on a white medium is advantageous, due to the resulting high contrast. Other colors or gray levels may, however, also be used for the calibration features. For example, suitable contrast may be obtained using a mid-scale gray level which may result in less toner or ink being used to print the calibration target. Similarly, it may prove desirable to print on a particular media type which is either colored or transparent to provide for calibration of a scanner to that particular media.

In an example embodiment, the printing of the first 22 and second 32 calibration features is on the same face of the medium 20*b*, accomplished by rotating the medium 180 degrees (that is, rotating the medium within a plane defined by the surface of the medium) as illustrated in the reorientation between FIGS. 2 and 3.

Figure 4:
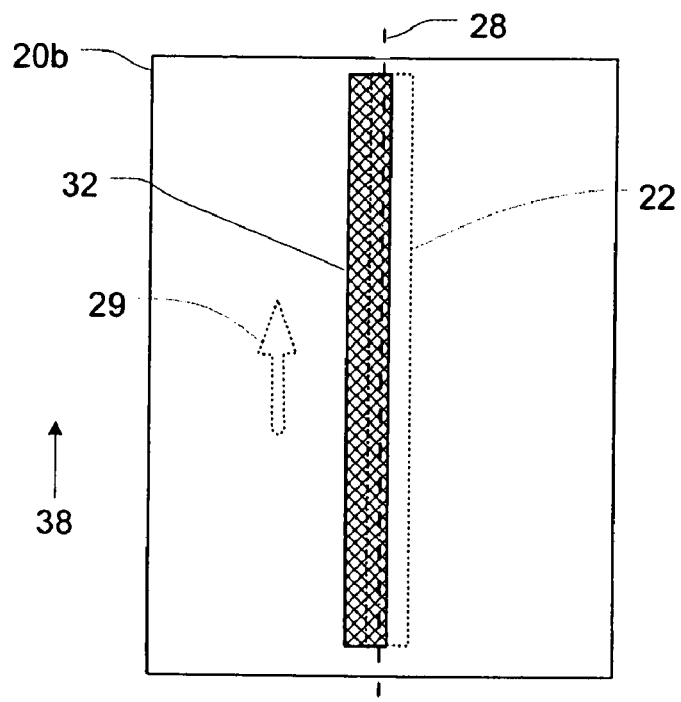
FIG. 4 is an illustration of a calibration target after printing a second calibration feature in accordance with another embodiment of the present invention.

In an alternate embodiment, the printing of the first and second calibration features may be on opposite faces of the medium, accomplished by flipping the medium over a longitudinal edge as illustrated in the reorientation of medium between FIG. 2 and FIG. 4. FIG. 4 illustrates the medium 20*b* after printing the second calibration feature 32 on the opposite side of the medium. The optional indicator 29 on the hidden face of the medium is shown for clarity in FIG. 4, although it is to be understood that the indicator need not be printed exactly as illustrated.

Figure 5:
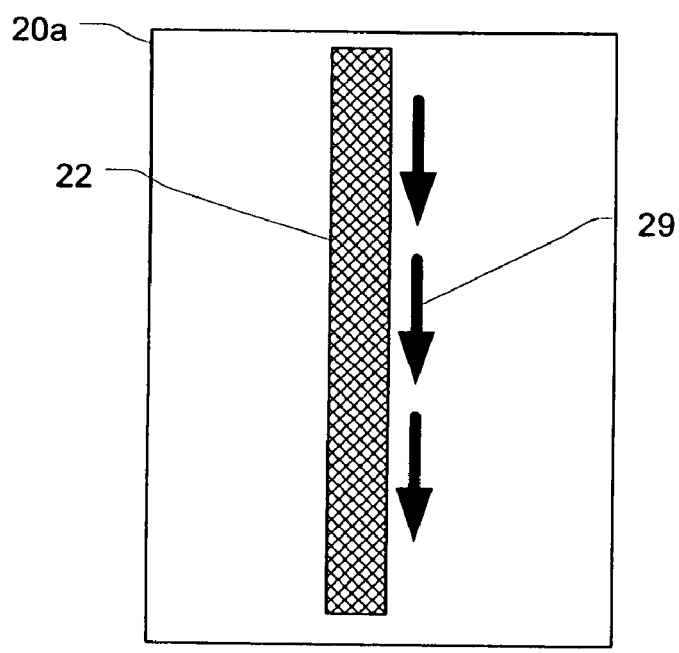
FIG. 5 is an illustration of a calibration target after printing a first calibration feature in accordance with another embodiment of the present invention.
Figure 6:
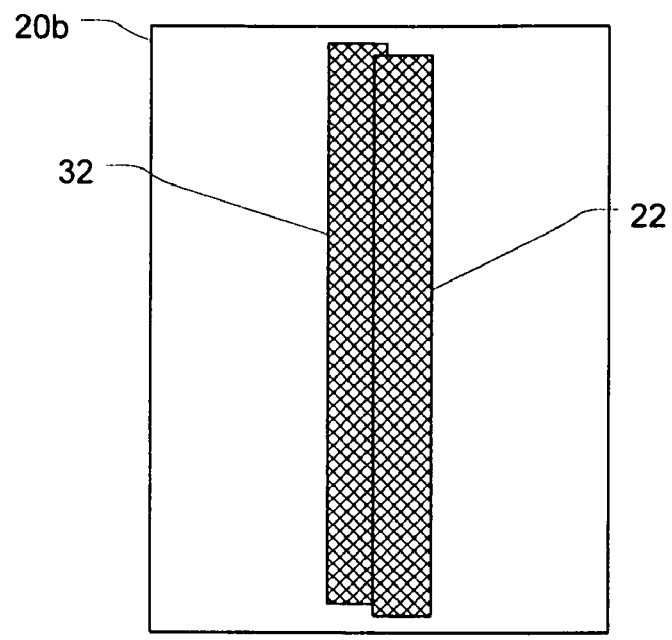
FIG. 6 is an illustration of a calibration target after printing a second calibration feature in accordance with another embodiment of the present invention.

In another embodiment of the present invention, more than one directional indicator 29 may be printed as illustrated in FIG. 5. In yet another embodiment of the present invention, the directional indicator may be located in such a way that the second calibration feature is printed directly over the directional indicator as illustrated in FIG. 6. In yet another embodiment of the present invention, a second direction indicator may be printed while printing the second calibration feature to show the correct direction for insertion of the target into a scanner.

Figure 8:
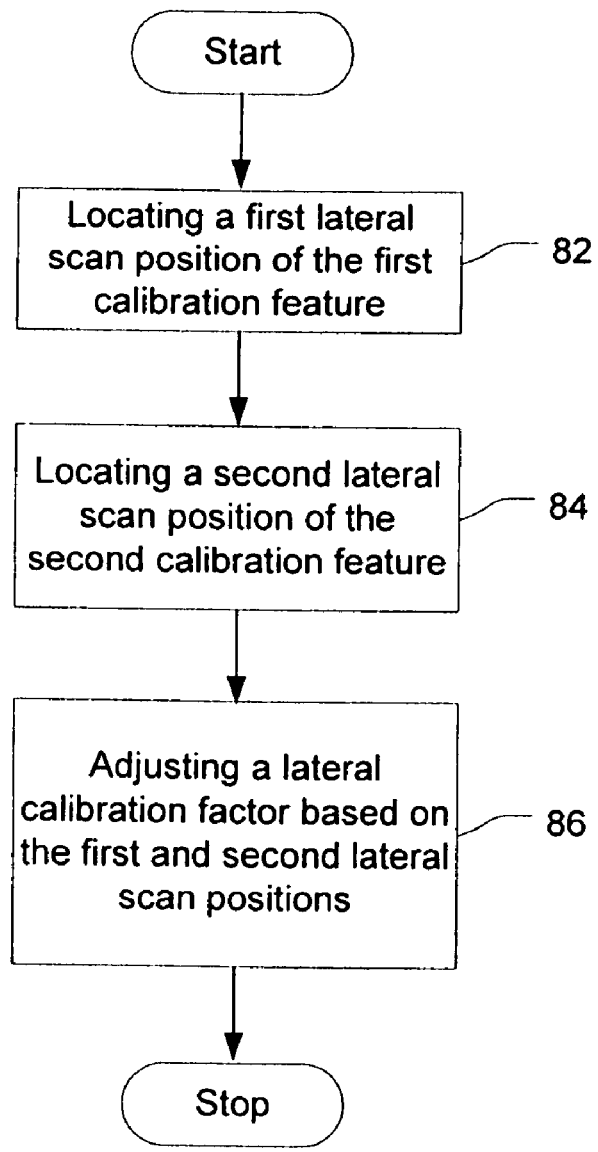
FIG. 8 is flow chart of a method of calibrating a scanner using a calibration target in accordance with an embodiment of the present invention.

Another embodiment of the present invention provides a method 80 of calibrating a scanner using a calibration target as shown in FIG. 8. The calibration target includes a first calibration feature at a first lateral location and a second calibration feature at a second lateral location, the first and second lateral locations are in a known relation to each other and may be offset by a printer offset. The method includes the step of locating 82 a first position$_{[AH2]}$ of the first calibration feature, wherein the first position is laterally offset from the center of the medium. The method also includes the step of locating 84 a second position of the second calibration feature, wherein the second position is laterally offset from the center of the medium in a direction opposite to the lateral offset of the first position. The method also includes the step of adjusting 86 a lateral calibration characteristic based on the first and second positions. Using this method, printer offset may be compensated for. Lateral calibration characteristics may include hardware or software adjustments within the scanner that correctly define the center or edges of the page. Printer offset may be compensated for in that errors related to the printer offset may be reduced or even eliminated entirely during the step of adjusting.

Figure 9:
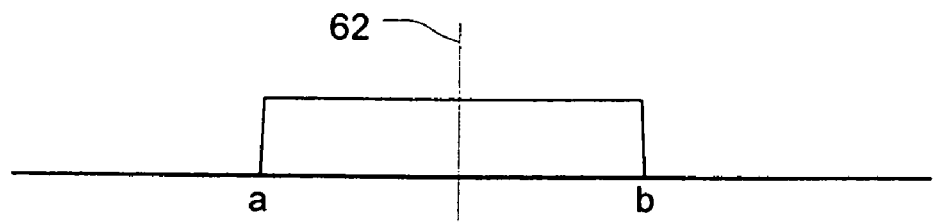
FIG. 9 is an illustration of the results for scanning a calibration target similar to FIG. 3 in accordance with an embodiment of the present invention.
Figure 10:
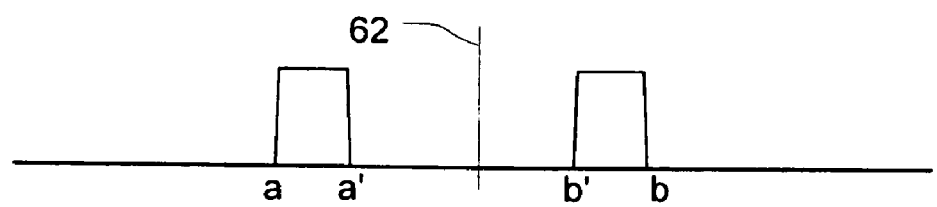
FIG. 10 is an illustration of the results for scanning a calibration target similar to FIG. 7 in accordance with an embodiment of the present invention.
Figure 11:
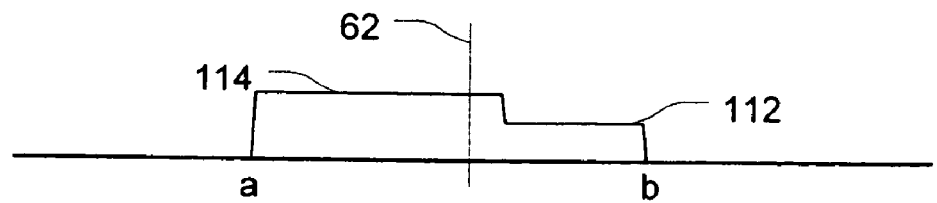
FIG. 11 is an illustration of the results for scanning a calibration target similar to FIG. 4 in accordance with an embodiment of the present invention.

Locating the first and second position will now be described in further detail. FIGS. 9-11 show the results for scanning a calibration target. The horizontal axis represents the lateral position of a row of pixels scanned by the scanning head. The vertical axis represents the pixel value. FIG. 9 represents the results for scanning a calibration target similar to that illustrated in FIG. 3. FIG. 10 represents the results for scanning a calibration target similar to that illustrated in FIG. 7, and FIG. 11 represents the results for scanning a calibration target similar to that illustrated in FIG. 4.

With respect to FIG. 11, some further explanation is warranted. Referring to FIG. 4, since one calibration feature is located on the opposite side of the page, that calibration feature will be weakly visible to the scan head. Hence, the pixel value 112 of the feature on opposite side of the calibration target from the scanner head may be quite different from the pixel value 114 of the feature on the same side of the calibration target as the scanner head. The difference in the pixel value corresponding to the features will depend on the degree of transparency of the medium and any bleed through in the printing process. Of course, if a two headed scanner is used that scans both sides of the calibration target simultaneously, the calibration features can be detected directly on each side, rather than relying on any transparency or bleed through.

If a directional indicator (29, FIG. 2) is included, detection of the directional indicator may also be performed to ensure that the calibration target was correctly inserted into the scanner. If the calibration target is not correctly inserted a notification or prompt may be provided. Such notification may, for example, be provided by a computer attached to the scanner or a display on a device that contains the scanner.

Locating 82 the first position may be accomplished by finding the white to black (black to white) transition of the calibration features as shown by pixel a in FIGS. 9-11. Similarly, locating 84 the second position may be accomplished by finding the white to black transition shown by pixel b.

Adjusting 86 a lateral calibration characteristic of the scanner may consist, for example, of determining a centerline position 62 within the scan head. For example, where the first and second calibration features are known to be located symmetrically opposite the centerline of the medium, the centerline position of the scanner may be chosen as the pixel exactly halfway between pixel a and b.

Alternately, as shown in FIG. 10, there may be more than one position associated with each calibration feature, in which case the same calibration operation may be performed using either the outer edges (a, b), inner edges (a', b'), or a combination of both.

Where the first and second calibration features are known to be located at different lateral positions, this may also be compensated for as will be explained. Furthermore, the first and second calibration features are not limited to longitudinally oriented features. In order to more clearly explain how this is possible, a mathematical derivation will now be presented.

Calibration may be performed on a single row of pixels of lateral extent. Let x represent the nominal lateral position of the first calibration feature relative to the centerline of the medium where it has intersected the scan head. Then −x+k represents the nominal lateral position of the second calibration feature, where k is the known relative lateral position of the first and second calibration features. The first calibration feature will actually be printed on the medium at a lateral position of x+o, where o represents the printer offset. The second calibration feature will actually be printed on the medium at a lateral position of −x+k−o+e, where e presents the small page to page error of the printer.

The scanner will detect the first calibration feature at pixel position a=x+o, and will detect the second calibration feature at pixel position b=−x+k−o+e. If k is equal to zero, corresponding to the first and second calibration feature being printed at the same nominal lateral positions, the centerline pixel can be defined at the location equally between a and b. If k is some other, known, value, the centerline can be found by shifting point b by k (to yield b"=−x−o+e). In either case, the error in defining the centerline will be given by a+b−k, which yields an error of e. The printer offset is thus substantially cancelled out with the exception of any remaining small page to page error e. As will be apparent to one skilled in the art, many other variations in coordinate systems and selection of origins may be used in performing this calibration.

Note that, even if k varies along the longitudinal length of the calibration target, for example when the calibration target is a slanted line, the centerline can still be found since k is known.

Although this derivation has focused on a single scan line, the invention is not limited to using a single scan line. For example, calibration may be performed using multiple scan lines, for example, by averaging the results for several scan lines.

Figure 14:
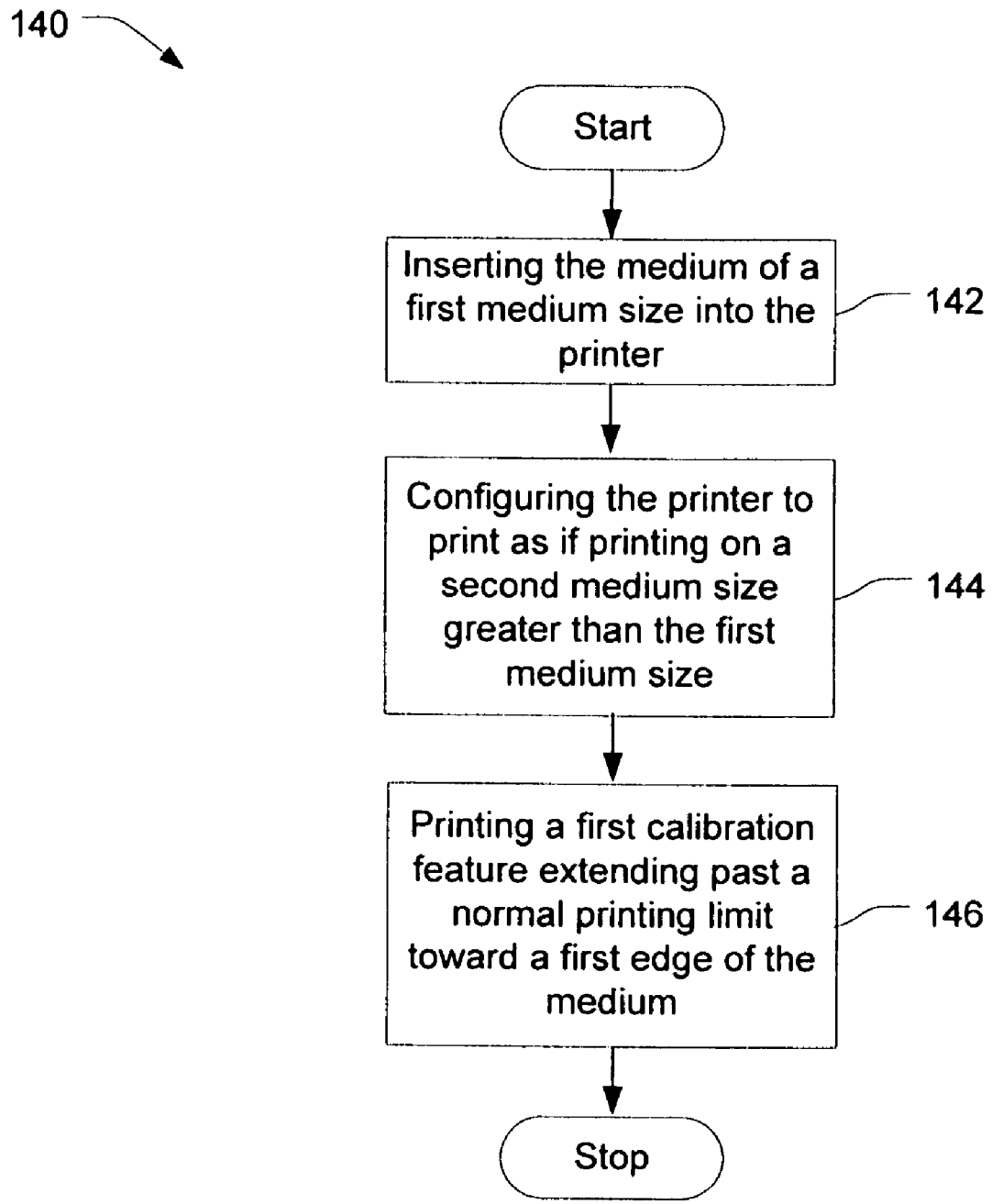
FIG. 14 is flow chart of a method of generating a calibration target usable for calibrating a medium edge dependent characteristic of a scanner in accordance with an embodiment of the present invention.

Another embodiment of the present invention provides a method 140 of generating a calibration target usable for calibrating a medium edge dependent characteristic of a scanner as shown in FIG. 14. A medium edge dependent characteristic may include time delay from a media sensor to the scan head parameter in a scanner equipped with an automatic document feeder or definition of the beginning of scan location. The method 140 allows a scanner to be calibrated to detect the edge of the medium. The method includes the step of inserting 142 the medium of a first medium size into a printer. The method further includes the step of configuring 144 the printer to print for printing on a second medium size greater than the first medium size. The method further includes the step of printing 146 a first calibration feature extending past a normal printing limit toward a first edge of the medium. A normal printing limit is a location near the edge of a medium at which a printer normally will not print.

Figure 15:
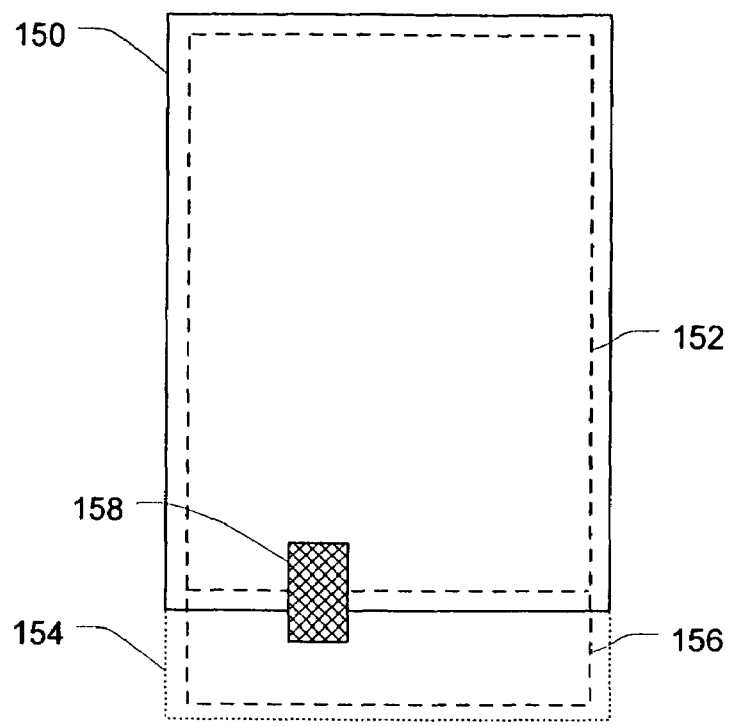
FIG. 15 is an illustration of a calibration target produced in accordance with the method of FIG. 14 in accordance with an embodiment of the present invention.
Figure 16:
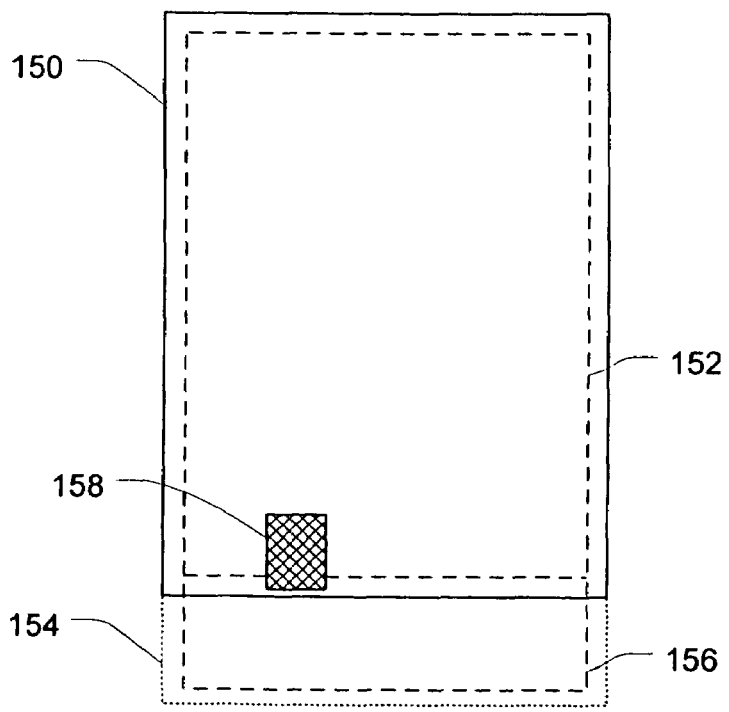
FIG. 16 is an illustration of a calibration target produced in accordance with the method of FIG. 14 in accordance with an embodiment of the present invention.

FIG. 15 provides an example calibration target 150 produced in accordance with the method 140 just described. The calibration target is printed on a first medium size, for example letter size paper (8.5×11 inches). The printable area is usually limited to an area 152 within the edges of the medium and thus does not extend to the edge of the paper. By configuring the printer to print as if printing on a second medium size 154, for example, legal size paper (8.5×14 inches), the printing area will be extended 156 past the edge of the paper. This enables the printing of the first calibration feature 158 past the normal printing limit (the boundary of area 152), into the extended printing area, toward the edge of the medium. The calibration feature may thus extend as far or as little into the extended printing area as desired. For example, the calibration feature may extend partway to the edge or all the way to the edge, or past the edge of the medium. This allows ink or toner to be placed as close to the edge as desired. For example, the first calibration feature 158 may be printed past the normal printing area 152 up to, but not past, the edge of the medium as illustrated in FIG. 16. It is desirable, in some implementations, to place the calibration feature close to the edge, for example within in a few scan lines, to provide the best accuracy with the calibration target. By avoiding the placement of ink or toner off the page, this may help prevent contamination of components within the printer by excess ink or toner.

The first and second medium size are not limited to letter and legal, respectively. For example, the first medium size may be A4 size paper, and the second medium size may be legal size. Any second medium size greater than the first medium size in at least one dimension such that the extended printing area (for example, 156 in FIG. 15) is provided will suffice. Various other combinations of paper sizes may be used, depending on the capability and configuration of the printer, as will occur to one of ordinary skill in the art.

Figure 17:
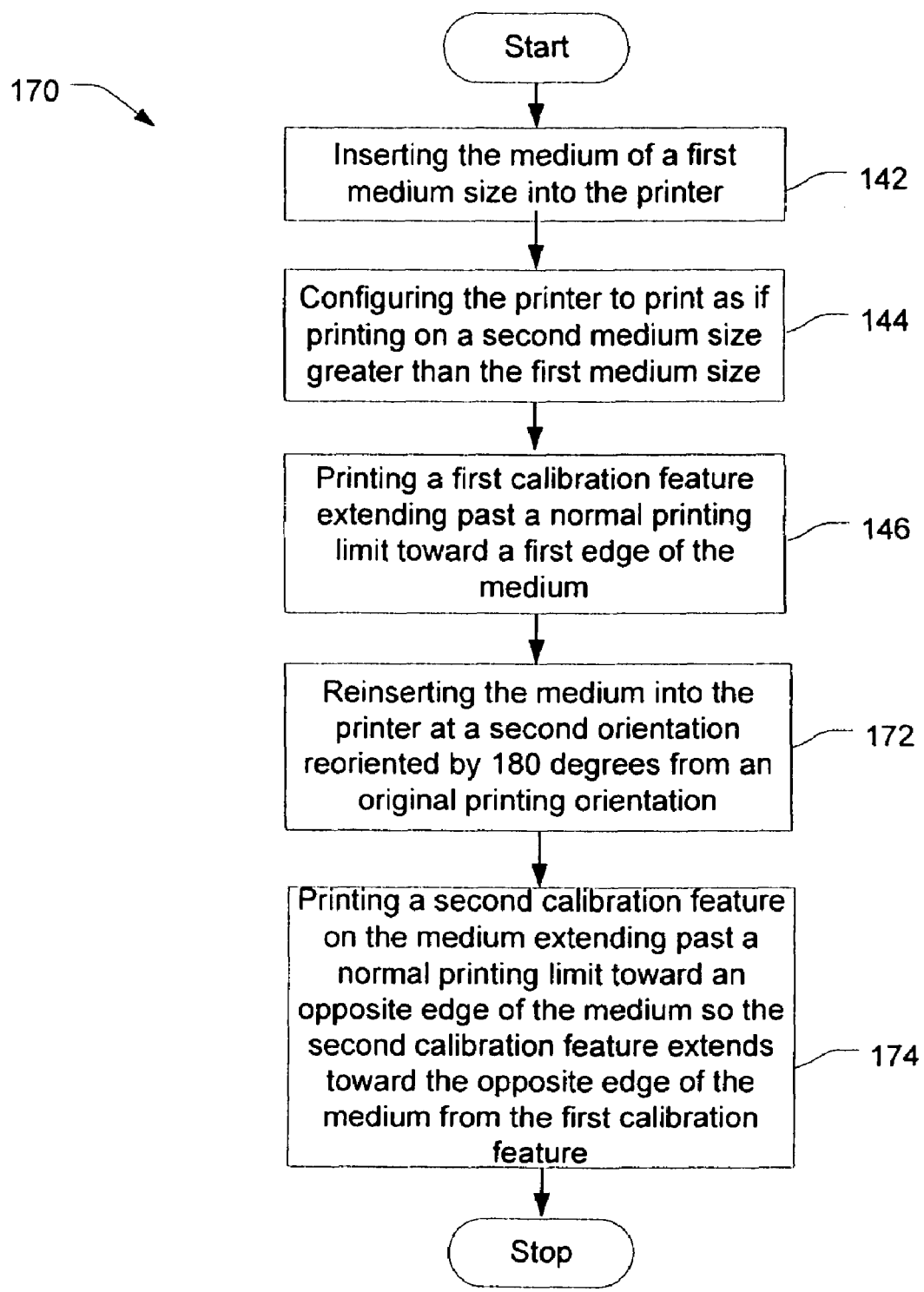
FIG. 17 is flow chart of a method of generating a calibration target usable for calibrating a medium length dependant characteristic of a scanner in accordance with another embodiment of the present invention.

Another embodiment of the present invention provides a method 170 of generating a calibration target usable for calibrating a medium length dependent characteristic of a scanner as illustrated in FIG. 17. The method 170 allows a scanner to be calibrated to detect the length of the medium. The method includes the steps 142, 144, 146 described for the previous method 140. The method further includes the step of reinserting 172 the medium into the printer at a second orientation reoriented by 180 degrees from an original printing orientation. The method further includes the step of printing 174 a second calibration feature on the medium extending past a normal printing limit toward an opposite edge of the medium so the second calibration feature extends toward the opposite edge of the medium from the first calibration feature. A medium length dependent characteristic may include a rate of feeding through an automatic document feeder, or a rate of movement of a scan head.

Figure 22:
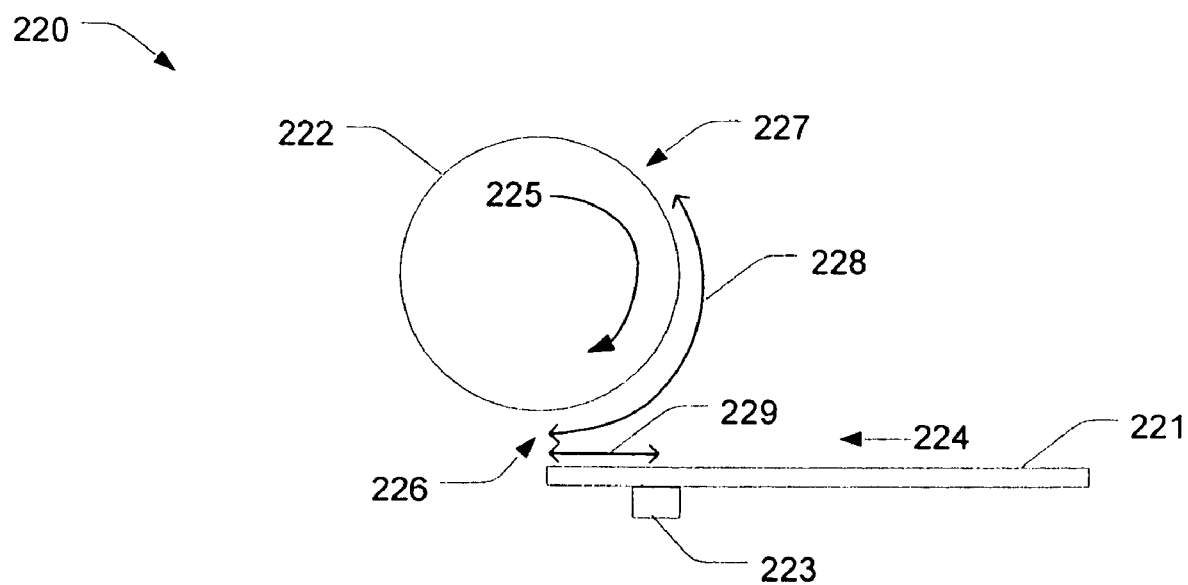
FIG. 22 is a simplified illustration of portions of a laser printer that includes a media sensor in accordance with an embodiment of the present invention.

Although the method is not limited to any particular type of printer, we now consider in further detail the operation of the method in a laser printer that includes a media sensor. FIG. 22 illustrates a side view of portions of a laser printer 220 that includes a feed 221, organic photo conductor 222, and media sensor 223. Media passes from the feed toward the organic photo conductor (direction 224) which rotates (direction 225) to transfer toner onto the medium at the transfer point 226. The toner is placed onto the organic photo conductor at the image formation point 227. Hence, it is desirable that the distance 228 from the image formation point to the transfer point is less than the distance 229 from the media sensor to the transfer point. This helps to avoid the printer detecting the trailing edge of the medium and disabling image formation. Hence, when using the method with an existing printer, it may be advantageous to select a tray that has this property. Alternately, operation of the media sensor may be disabled while printing the calibration target.

Figure 18:
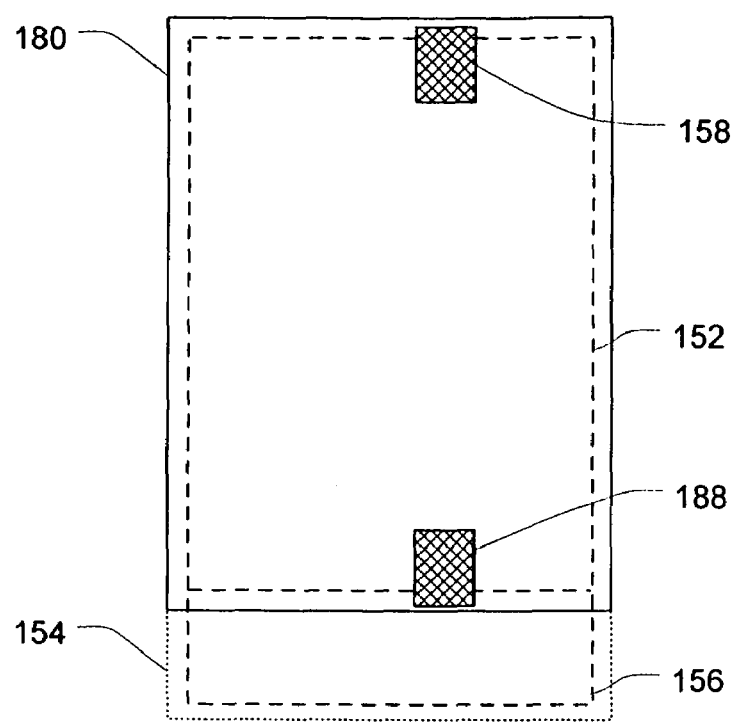
FIG. 18 is an illustration of a calibration target produced in accordance with the method of FIG. 17 in accordance with an embodiment of the present invention.

FIG. 18 provides an example calibration target 180 produced in accordance with the method 170 just described. This shows the calibration target after rotation by 180 degrees, hence the first calibration feature 158 is at the top of FIG. 18, and the second calibration feature 188 is near the bottom.

As discussed above, a directional indicator (e.g. 29 in FIGS. 2 and 16) may also be printed to aid in reinserting 172 the medium. Additionally, a directional indicator or other instructions may also be printed to aid in properly orienting and using the calibration target.

Although in some embodiments, it may be desirable that the first and second calibration features 158, 188 are printed on the same face of the medium, this is not necessary, as discussed previously. Furthermore, the first and second calibration features are not limited to rectangles as illustrated in FIGS. 15, 16, and 18; different shapes or patterns may be used as the calibration feature. Additionally, the lateral position of the calibration feature is similarly unconstrained, although it may prove advantageous in some implementations to position the calibration feature(s) at a known lateral position. For example, if the calibration feature is placed at the same lateral location as the media sensor, this helps to minimize errors introduced by skew in the media feed. Hence, the first and second calibration feature may be printed so that they are at approximately the same lateral position, for example as shown in FIG. 18. Alternately, the first and second calibration feature may be symmetrically placed about a centerline of the media as previously discussed.

Figure 19:
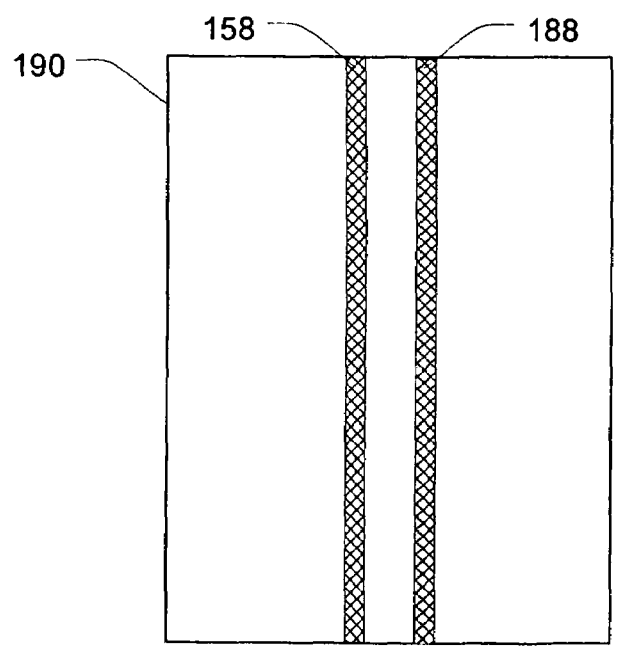
FIG. 19 is an illustration of a calibration target produced in accordance with the method of FIG. 17 in accordance with an embodiment of the present invention.

Accordingly, in another embodiment of the present invention, a calibration target useful for simultaneous calibration of both a laterally sensitive characteristic and an edge sensitive characteristic of a scanner may be printed by printing the first calibration feature at a first lateral location and printing the second calibration feature at a second lateral location with a known relation to the first lateral location. An example of such a calibration target 190 is shown in FIG. 19.

Figure 20:
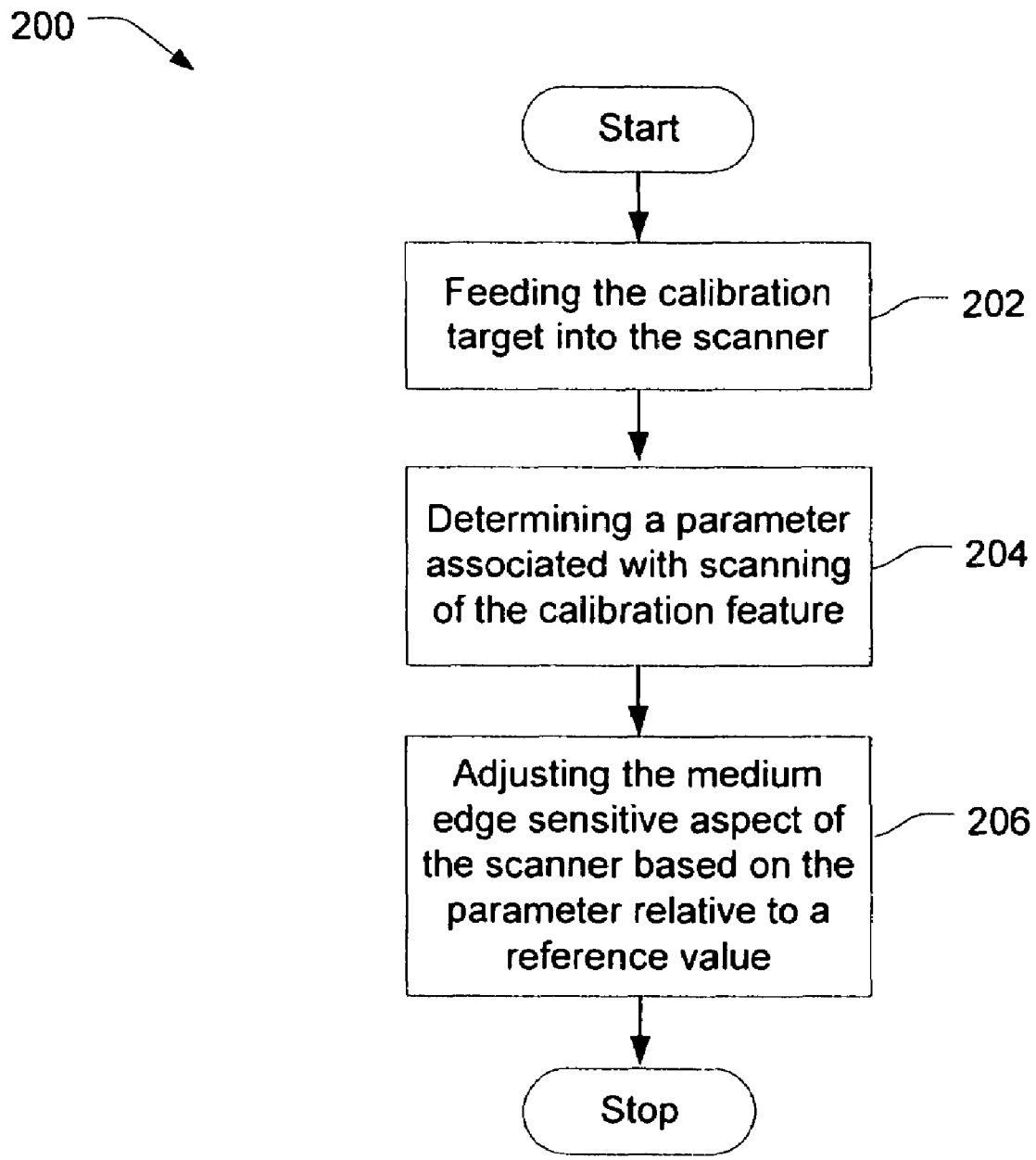
FIG. 20 is flow chart of a method of calibrating a scanner using a calibration target which includes a calibration feature extending substantially to an edge of the calibration target in accordance with an embodiment of the present invention.

Another embodiment of the present invention provides a method 200 of calibrating a scanner using a calibration target which includes a calibration feature extending substantially to an edge of the calibration target as shown in FIG. 20. The method includes the step of feeding 202 the calibration target into the scanner. The method further includes the step of determining 204 a parameter associated with scanning of the calibration feature. The method further includes the step of adjusting 206 the medium edge dependent characteristic of the scanner based on the parameter relative to a reference value.

Figure 21:
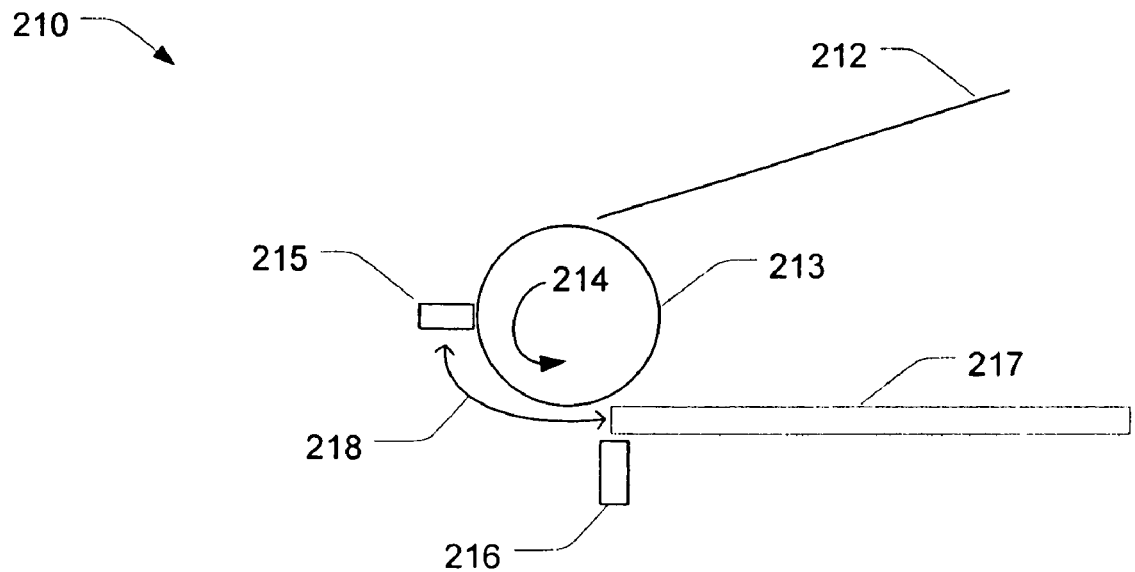
FIG. 21 is a simplified illustration of portions of a scanner showing a scan head and media sensor in accordance with an embodiment of the present invention.

For example, the method 200 may be used to calibrate the time delay from a media sensor to the scan head parameter in a scanner equipped with an automatic document feeder. FIG. 21 illustrates a side view of portions of a scanner 210, with feed tray 212. Documents travel through the feed 213 (direction 214) past a media sensor 215 to the scan head 216 and platen 217. The time delay corresponds to the distance 218 from the media sensor to the scan head.

Figure 24:
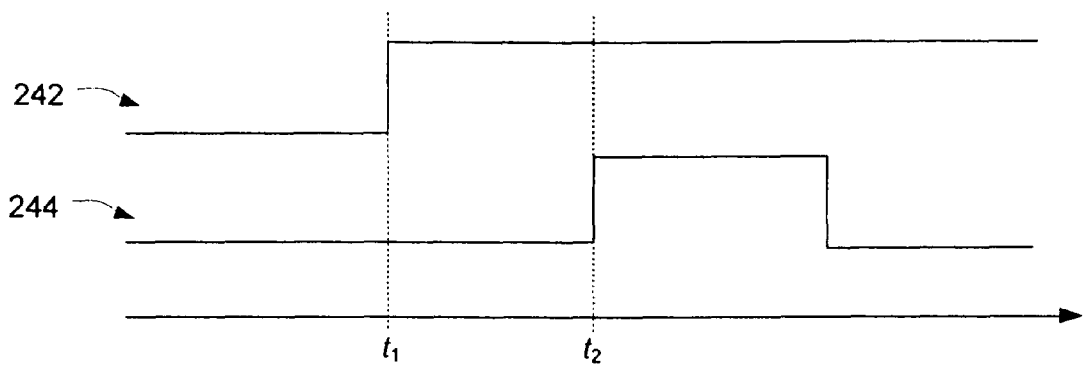
FIG. 24 is a timing diagram showing the timing of output from the media sensor and scan head of FIG. 21 when the calibration target similar to FIG. 15 is fed and scanned.

FIG. 24 illustrates a timing diagram of the output 242 from the media sensor (215 in FIG. 21) and the output 244 from the scan head (216 in FIG. 21) when a calibration target similar to that of FIG. 15 is fed and scanned. The horizontal axis represents time. As the calibration target passes the media sensor, the media sensor output will transition at reference time $t_1$. As the calibration target passes the scan head, the scan head output will transition at time $t_2$. Hence, the time delay parameter is given by $t_1 - t_2$. This time delay parameter may be used to adjust the start scan timing of the scanner.

Figure 23:
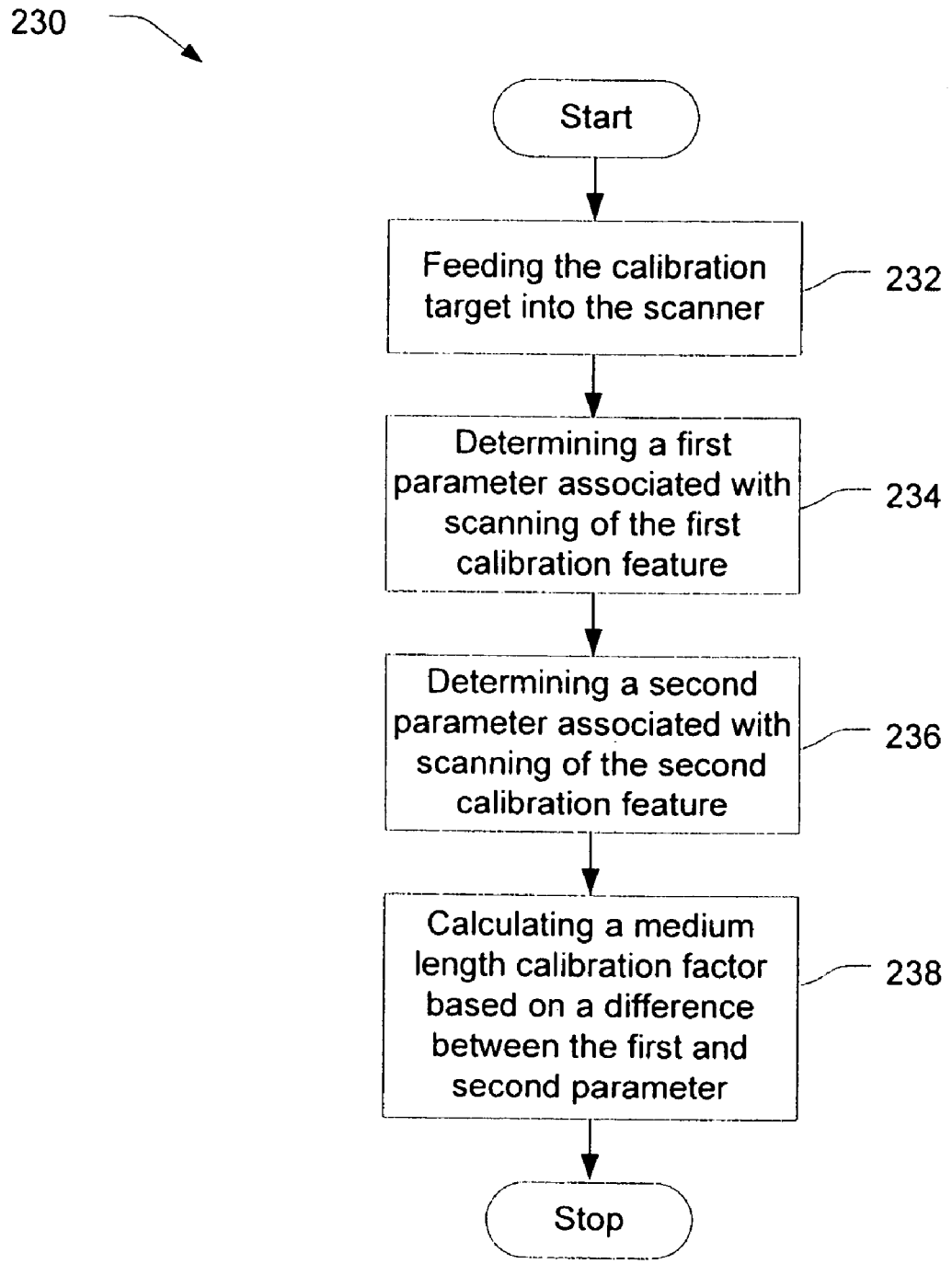
FIG. 23 is flow chart of a method of calibrating a medium length dependant characteristic of a scanner using a calibration target comprising a first and second calibration feature located at opposite ends of the calibration target in accordance with an embodiment of the present invention.

Another embodiment of the present invention provides a method 230 of calibrating a medium length dependant characteristic of a scanner using a calibration target comprising a first and second calibration feature located at opposite ends of the calibration target and extended to edges of the calibration target as shown in FIG. 23. The method 230 allows a scanner to be calibrated to detect the length of the medium. The method includes the step of feeding 232 the calibration target into the scanner. The method further includes the step of determining 234 a first parameter associated with scanning of the first calibration feature by the scanner. The method further includes determining 236 a second parameter associated with scanning of the second calibration feature by the scanner. The method further includes calculating 238 a medium length calibration factor based on a difference between the first and second parameter.

Figure 25:
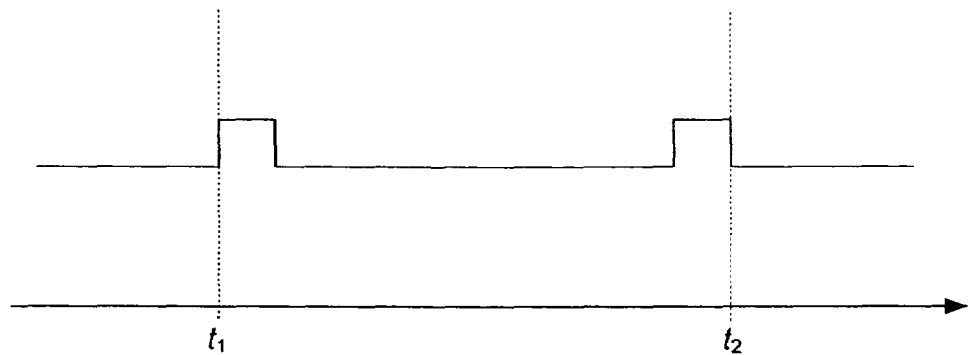
FIG. 25 is a timing diagram showing the output from scan head of FIG. 21 when the calibration target similar to FIG. 18 is fed and scanned.

For example, FIG. 25 illustrates a timing diagram of the output 252 from the scan head (216 in FIG. 21) when a calibration target similar to FIG. 18 is fed and scanned. The first transition at time $t_1$ corresponds to the first parameter when the leading edge of the first calibration feature passes across the scan head. The last transition at time $t_2$ corresponds to the second parameter when the trailing edge of the second calibration feature passes across the scan head. Hence, time $t_1$ and $t_2$ correspond to the edges of the medium, or correspond to the medium length. A difference between $t_1$ and $t_2$ may be formed to provide a medium length calibration factor.

This medium length calibration factor may be used to adjust characteristics of the scanner operation that are dependent on medium length. For example, scan-line to scan-line placement will be a function of the medium length calibration factor, or rate at which scanned documents feed past the scan head. Calibration to compensate for changes in medium length caused by mechanical wear, medium stretch, or differing medium surface characteristics can thus be accomplished. For example, by printing a calibration target on the exact medium type to be scanned, inaccuracies due to differences in feed rate caused by the medium surface can be reduced. Similarly, periodic calibration for medium feed rate variations caused by mechanical wear may be conveniently performed by simply printing a calibration target and calibrating the scanner using that calibration target.

Although described as though the scan head is fixed and the calibration target moves across the scan head, those of ordinary skill in the art will appreciate that the principle of operation is the same if the calibration target is held in a fixed position on the scanner platen and the scan head moves.

Figure 12:
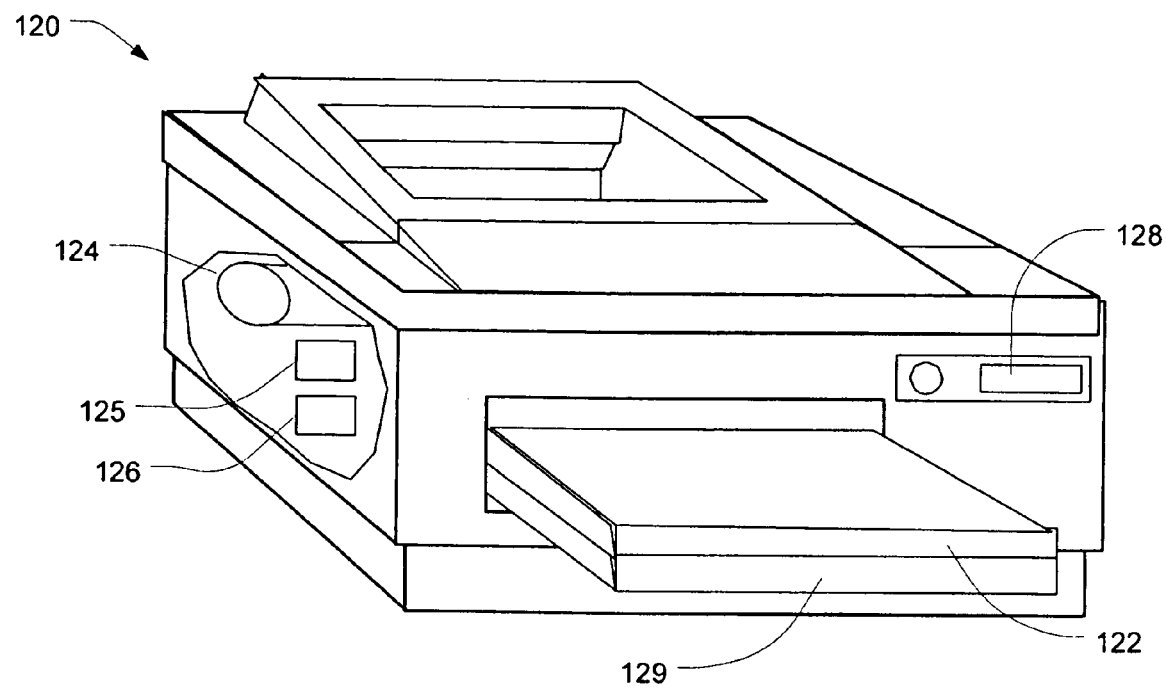
FIG. 12 is a simplified illustration with a cutaway internal view of a printer capable of generating a calibration target in accordance with an embodiment of the present invention.

In accordance with another embodiment of the present invention, a printer 120 capable of generating a calibration target on a medium is shown in FIG. 12. The printer may include a media feed 122, a print mechanism 124, and a first calibration target print mechanism 125. The print mechanism may be any device a printer can use to place ink or toner on a medium, such as a revolving photoreceptor drum in a laser printer (as shown in FIG. 12 124), a print head in an ink jet printer, and so forth. The first calibration target print mechanism may be software in a computer that is connected to a printer. The software can send data to the printer instructing it to print a calibration target on the medium. Alternatively, the first calibration target print mechanism may be software, firmware, or hardware located in the printer that, when activated, allows a user to print a calibration target. The mechanism may be activated by pushing a button on the printer.

In a first embodiment of the printer, the first calibration target print mechanism 125 is configured to cause the print mechanism 124 to print a first calibration feature at a first lateral location on the medium.

In a second embodiment of the printer, the first calibration target mechanism 125 is configured to cause the print mechanism 124 to print a first calibration feature on the medium so that the first feature extends past a normal printing limit toward a first edge of the medium.

Optionally, in accordance with another embodiment of the present invention, the printer may include a medium reinsertion mechanism and a second calibration target print mechanism 126. The medium reinsertion mechanism can be triggered by the first calibration target print mechanism 125 and configured to trigger reinsertion of the medium reoriented by 180 degrees from an original orientation. In a third embodiment of the printer, the second calibration target print mechanism is configured to cause the print mechanism to print a second calibration feature at a second lateral location in known relation to the first lateral location on the medium after reinsertion. In a fourth embodiment of the printer, the second calibration target print mechanism is configured to cause the print mechanism to print a second calibration feature on the medium after reinsertion so that the second calibration feature extends past a normal printing limit toward a second edge of the medium opposite the first edge.

Various options for the medium reinsertion mechanism will occur to one of ordinary skill in the art. For example, in one embodiment, as illustrated in FIG. 12 the reinsertion mechanism may include a prompter 128 which prompts a user to reinsert the medium into the printer. In an alternate embodiment, the reinsertion mechanism may include a feed tray 129, also known as a duplexing tray, which rotates the medium 180 degrees from the original orientation. Alternately, the prompter 128 may be provided by signaling a user through a computer attached to the printer or a display on a device that contains the printer.

The details of the calibration feature(s) to be printed may be stored in an image file, or may be generated algorithmically. For example, an image file corresponding to the first calibration feature might be stored, and this same image file used to print the second calibration feature.

Figure 13:
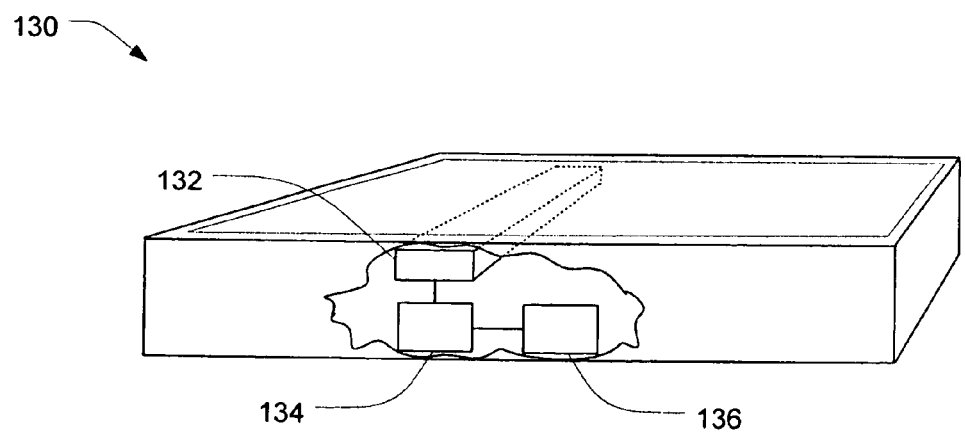
FIG. 13 is a simplified illustration with a cutaway internal view of a scanner capable of performing calibration using a calibration target in accordance with an embodiment of the present invention.

In accordance with another embodiment of the present invention, a scanner 130 capable of performing calibration using a calibration target is shown in FIG. 13. The scanner includes a scan head 132, a locator 134 communicating with the scan head, and an adjuster 136 communicating with the scan head.

In a first embodiment of the scanner, the locator 134 is configured to determine a first lateral feature parameter and a second lateral feature parameter, and the adjuster 136 is configured to accept the first and second lateral feature parameters from the locator and to determine a lateral calibration characteristic based in part on the first and second lateral feature parameters so that the printer offset is compensated for.

In a second embodiment of the scanner, the locator 134 is configured to determine a parameter associated with the scanning of a first calibration feature, and the adjuster is configured to accept the parameter from the locator and to adjust a medium edge dependent characteristic of the scanner based on the parameter relative to a reference.

In a third embodiment of the scanner, the locator 134 is configured to determine a first parameter corresponding to the scanning of the first calibration feature and configured to determine a second parameter corresponding to the scanning of the second calibration feature, and the adjuster 136 is configured to accept the first and second parameters from the locator and to adjust a medium length sensitive characteristic of the scanner based on a difference between the first and second parameters.

A calibration target produced in accordance with embodiments of the invention can be printed on virtually any printer. Hence, a calibration target can easily be printed by a customer or field service technician using a printer conveniently located near the scanner to be calibrated. This may reduce the expense and delay associated with special ordering a calibration target.

It is to be understood that the above-referenced arrangements are illustrative of the application for the principles of the present invention. Numerous modifications and alternative arrangements can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

What is claimed is:

1. A method comprising:
    locating a position of at least one calibration feature printed upon a medium;
    adjusting a calibration characteristic based on the located position of the at least one calibration feature;
    printing the at least one calibration feature on the medium, wherein the printing of the at least one calibration feature on the medium comprises:
        inserting the medium into a printer with a first orientation;
        printing a first calibration feature at a first lateral location on the medium;
        reinserting the medium into the printer with a second orientation rotated 180 degrees from the first orientation; and
        printing a second calibration feature at a second lateral location on the medium, wherein the first and second calibration features are printed on a same face of the medium.

2. The method of claim 1, wherein the first calibration feature comprises a longitudinally oriented line and wherein the second calibration feature comprises a longitudinally oriented line.

3. The method of claim 1, wherein the first and second calibration features are printed at a substantially identical position relative to a center line of the printer so that the first and second calibration features are located substantially laterally symmetrically about a center line of the medium.

4. The method of claim 1, comprising the step of printing a directional indicator prior to the reinserting step showing the second orientation for reinsertion of the medium.

5. The method of claim 1, wherein the adjusting of the calibration characteristic based on the located position of the at least one calibration feature comprises:
    locating a first position of a first calibration feature on a medium;
    locating a second position of a second calibration feature on the medium; and
    adjusting a lateral calibration characteristic based on the first position and the second position.

6. The method of claim 5, wherein the step of adjusting a lateral calibration characteristic comprises defining a scan center line at a location equally between the first and second positions.

7. An apparatus comprising:
    a scan head;
    a locator communicating with the scan head and configured to determine positions of a first calibration feature and a second calibration feature on a face of a medium;
    an adjuster configured to accept the determined position from the locator and to determine a calibration characteristic for the scan head based in part on the determined positions;
    a media feed;
    a print mechanism configured to accept the medium from the media feed and print the at least one calibration feature on the medium;
    a first calibration target print mechanism configured to cause the print mechanism to print a first calibration feature at a first lateral location on the medium;
    a medium reinsertion mechanism triggered by the first calibration target print mechanism configured to trigger reinsertion of the medium into the print mechanism reoriented by 180 degrees from an original orientation; and
    a second calibration target print mechanism configured to cause the print mechanism to print a second calibration feature at a second lateral location in known relation to the first lateral location on the medium after reinsertion.

8. The apparatus of claim 7, wherein the medium reinsertion mechanism comprises a prompter configured to prompt reinsertion of the medium into the printer.

9. The apparatus of claim 7, wherein the medium reinsertion mechanism comprises a feed tray configured to rotate the medium 180 degrees from the original orientation.

10. The apparatus of claim 7, wherein the locator is configured to determine a first lateral feature parameter and a second lateral feature parameter of a calibration target, the first and second lateral feature parameters offset by a printer offset and wherein the adjuster is configured to accept the first and second lateral feature parameters from the locator and to determine a lateral calibration characteristic based in part on the first and second lateral feature parameters.

11. The apparatus of claim 10, wherein the adjuster is configured to determine a scan center line at a location equally between the first and second positions.

12. The apparatus of claim 10, wherein the adjuster is configured to determine the lateral calibration characteristic based in part on the known lateral relation of the first and second lateral locations.

* * * * *